United States Patent
Choi et al.

(10) Patent No.: US 8,992,135 B2
(45) Date of Patent: Mar. 31, 2015

(54) CUTTING TOOL

(75) Inventors: Chang Hee Choi, Daegu (KR); Hong Sik Park, Daegu (KR)

(73) Assignee: TaeguTec, Ltd., Dalsung-gun, Daegu (KR)

(*) Notice: Subject to any disclaimer, the term of this patent is extended or adjusted under 35 U.S.C. 154(b) by 70 days.

(21) Appl. No.: 13/520,293

(22) PCT Filed: Feb. 10, 2010

(86) PCT No.: PCT/KR2010/000821
§ 371 (c)(1),
(2), (4) Date: Jul. 2, 2012

(87) PCT Pub. No.: WO2011/087180
PCT Pub. Date: Jul. 21, 2011

(65) Prior Publication Data
US 2013/0058729 A1    Mar. 7, 2013

(30) Foreign Application Priority Data
Jan. 14, 2010  (KR) .......... 10-2010-0003520

(51) Int. Cl.
*B23B 27/02*   (2006.01)
*B23B 29/04*   (2006.01)
(Continued)

(52) U.S. Cl.
CPC ............. *B23B 29/043* (2013.01); *B23B 27/045* (2013.01); *B23B 2205/02* (2013.01)
USPC ................ 407/107; 407/42; 407/50; 407/110

(58) Field of Classification Search
CPC  B23B 27/04; B23B 2210/08; B23B 2205/02; B23B 2205/00; B23C 5/12; B23C 5/22; B23C 5/2239

USPC .............................. 407/107, 109, 110, 42, 50
See application file for complete search history.

(56) References Cited

U.S. PATENT DOCUMENTS

| | | | | |
|---|---|---|---|---|
| 5,100,268 A | * | 3/1992 | Nakayama et al. | 407/104 |
| 5,803,675 A | * | 9/1998 | Von Haas | 407/107 |

(Continued)

FOREIGN PATENT DOCUMENTS

| | | |
|---|---|---|
| JP | H06 190608 | 7/1994 |
| JP | 2004-042168 | 2/2004 |

(Continued)

OTHER PUBLICATIONS

Office Action dated Sep. 6, 2013 issued in Japanese counterpart application (No. 2012-544341).

(Continued)

*Primary Examiner* — Will Fridie, Jr.
(74) *Attorney, Agent, or Firm* — Womble Carlyle

(57) ABSTRACT

A cutting tool includes a cutting insert and a tool holder. The tool holder includes: a base for supporting a bottom surface of the cutting insert; a clamping arm for pressing a top surface of the cutting insert; an insert receiving space formed between the bottom surface of the clamping arm and the base; and a supporting surface which defines an end of the insert receiving space and supports an end of the cutting insert. The cutting insert includes: a first pressing region on the front portion of the top surface which is oriented in a vertically upward direction; and a second pressing region on the rear portion of the top surface which is oriented at an angle in the front direction.

13 Claims, 3 Drawing Sheets

(51) Int. Cl.
*B23B 27/04* (2006.01)
*B23C 5/02* (2006.01)

(56) References Cited

U.S. PATENT DOCUMENTS

| | | | |
|---|---|---|---|
| 5,836,723 A * | 11/1998 | Von Haas et al. | 407/107 |
| 6,176,649 B1 * | 1/2001 | Friedman | 407/110 |
| 6,428,247 B1 * | 8/2002 | Friedman | 407/110 |
| 6,702,527 B2 * | 3/2004 | Barazani | 407/42 |
| 7,329,072 B2 * | 2/2008 | Nagaya et al. | 407/109 |
| 7,524,147 B2 * | 4/2009 | Hecht | 407/107 |
| 8,376,664 B2 * | 2/2013 | Hecht | 407/107 |
| 8,388,273 B2 * | 3/2013 | Eder et al. | 407/107 |
| 2004/0256608 A1 | 12/2004 | Eder et al. | |
| 2005/0186039 A1 * | 8/2005 | Muller et al. | 407/113 |
| 2007/0160432 A1 | 7/2007 | Eder et al. | |
| 2009/0285645 A1 * | 11/2009 | Hecht | 407/107 |
| 2010/0319810 A1 | 12/2010 | Patsch et al. | |
| 2011/0164933 A1 * | 7/2011 | Park et al. | 407/107 |
| 2012/0051852 A1 | 3/2012 | Choi et al. | |
| 2012/0195702 A1 | 8/2012 | Eder et al. | |

FOREIGN PATENT DOCUMENTS

| | | |
|---|---|---|
| JP | 2005-279823 | 10/2005 |
| JP | 2007-210050 | 8/2007 |
| JP | 2009-113185 | 5/2009 |

OTHER PUBLICATIONS

Office Action dated Oct. 8, 2013 issued in German counterpart application (No. 11 2010 005 139.9).
International Search Report in PCT/KR2010/000821, dated Feb. 24, 2011.
Written Opinion in PCT/KR2010/000821, dated Feb. 24, 2011.

* cited by examiner

CUTTING TOOL

RELATED APPLICATIONS

This is a 35 USC 371 U.S. National Phase of International Application No. PCT/KR2010/000821 filed 10 Feb. 2010 and published in English as WO 2011/087180A1 on 21 Jul. 2011, which claims priority to KR 10-2010-0003520, filed 14 Jan. 2010. The contents of the aforementioned applications are incorporated by reference in their entirety.

TECHNICAL FIELD

The present invention generally relates to cutting tools, and more particularly to a cutting tool which can better safely mount a cutting insert.

BACKGROUND ART

Generally, a lathe is configured such that a cutting insert comes in contact with a rotating workpiece and cuts the workpiece while feeding along a rotational axis. In such a case, a safe fixation of the cutting insert to the tool holder is an important factor for achieving a desired cutting performance.

In the cutting insert (10) of the prior art, the top surface had an elongated concave shape in the left and right directions as shown in FIG. 1. The clamping arm of the tool holder presses the concave portion on the top surface of the cutting insert (10) in the downward direction to firmly secure the cutting insert. However, in such a case, only the frictional force between the clamping arm and the top surface of the cutting insert constrains the cutting insert in the horizontal direction. Thus, the cutting insert (10) may be pulled out of the tool holder.

In order to solve such a problem, an angled surface (22) was formed on the top surface of the cutting insert (20) in the prior art as shown in FIGS. 2 and 3, while the clamping arm (30) of the tool holder formed a nose (32) for mating with the angled surface (22). Accordingly, when the clamping arm (30) presses the cutting insert (20), the pressing force may be directed in the angled direction toward the tool holder, thereby preventing the cutting insert (20) from being pulled out of the tool holder (30, 40). However, in such a case, since the contact area between the clamping arm (30) and the angled surface (22) becomes extremely narrowed, the clamping force cannot be sufficient to fix the cutting insert (20).

In order to solve the above problem, the prior art employed a structure wherein the cutting insert can be simultaneously pressed both in the vertically downward direction and the angled direction, as disclosed in U.S. Pat. No. 6,176,649 (see FIG. 4). However, according to the structure shown in FIG. 4, the front portion of the clamping arm must have a nose in order to press the front portion of the cutting insert in the angled direction. The clamping arm is vulnerable to failure since the clamping force is concentrated on the nose of the front portion. Furthermore, the clamping force is weak.

SUMMARY

The present invention is directed to solving the above-mentioned problem of the prior art and provide a cutting insert which is capable of more firmly fixing the cutting insert while maintaining the strength of the clamping arm.

The cutting tool of the present invention comprises a cutting insert and a tool holder. The tool holder comprises: a base for supporting a bottom surface of the cutting insert; a clamping arm for pressing a top surface of the cutting insert; an insert receiving space formed between the bottom surface of the clamping arm and the base; and a supporting surface which defines an end of the insert receiving space and supports an end of the cutting insert. The cutting insert comprises: a first pressing region on the front portion of the top surface which is oriented in a vertically upward direction; and a second pressing region on the rear portion of the top surface which is oriented at an angle in the front direction. The front portion of the clamping arm mates with the first pressing region, while the rear portion of the clamping arm comprises a projection on the bottom surface which is formed to be mated with the second pressing region. The front portion of the clamping arm presses the first pressing region in the vertically downward direction, while the projection of the clamping arm presses the second pressing region in the angled direction toward the tool holder.

According to the present invention, the projection on the rear portion of the clamping arm serves to press the cutting insert at an angle so as to prevent the cutting insert from being pulled out of the tool holder. Accordingly, the front portion of the clamping arm does not need to have any nose portion. Thus, the cutting insert may be more firmly fixed in the tool holder while maintaining the strength of the clamping arm.

BRIEF DESCRIPTION OF DRAWINGS

FIG. 2 shows a perspective view of the prior cutting tool wherein the cutting insert is pressed only in an angled direction, while

DETAILED DESCRIPTION

The present invention is explained below with reference to the preferred embodiments.

Figure 1:
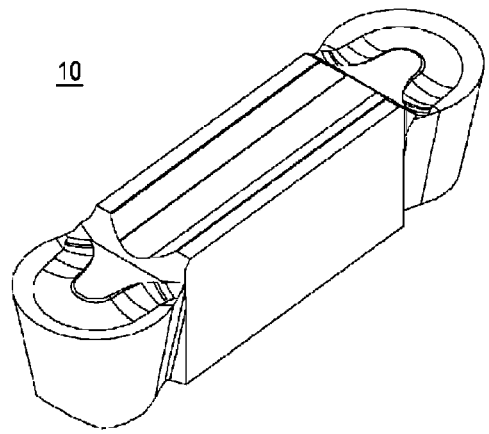
FIG. 1 shows a cutting insert of the prior art which is pressed only in a vertically downward direction.
Figure 2:
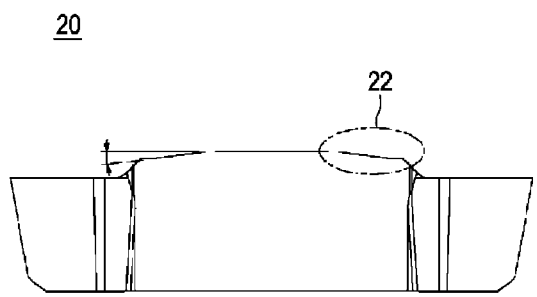
Figure 3:
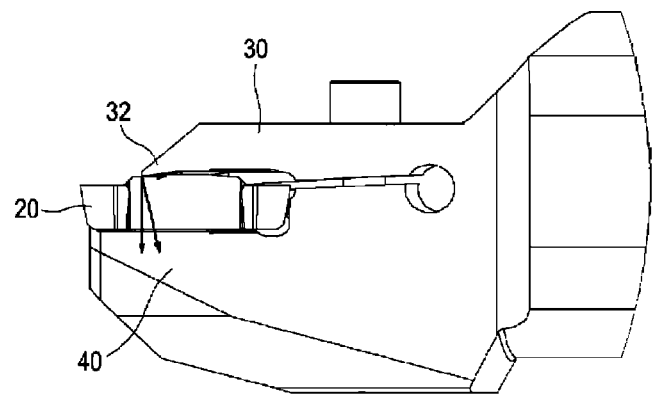
FIG. 3 shows the cutting insert used in the cutting tool.
Figure 4:
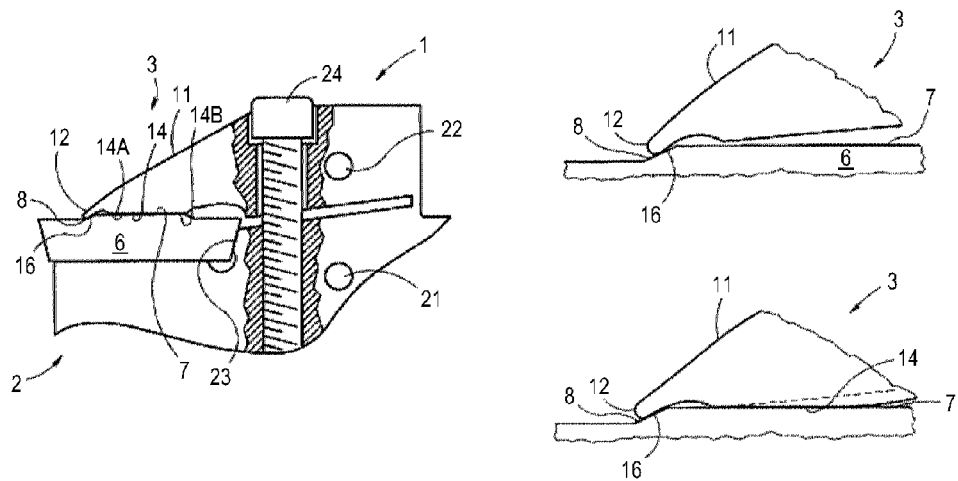
FIG. 4 shows a perspective view of the prior cutting tool wherein the cutting insert is pressed in the angled direction at the front portion and in the downward direction at the rear front portion.
Figure 5:
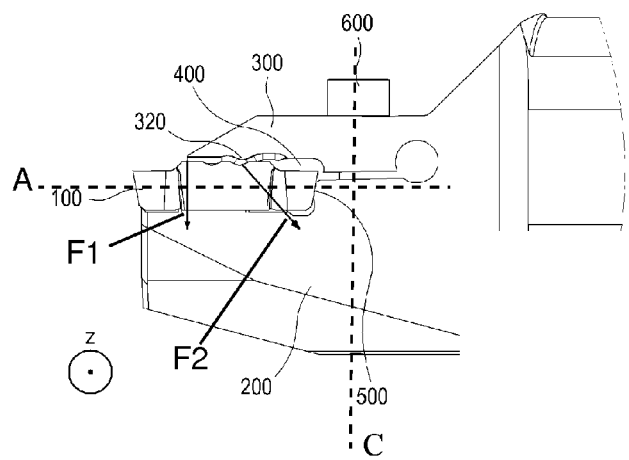
FIG. 5 shows a side view of the cutting tool according to one embodiment of the present invention.
Figure 6:
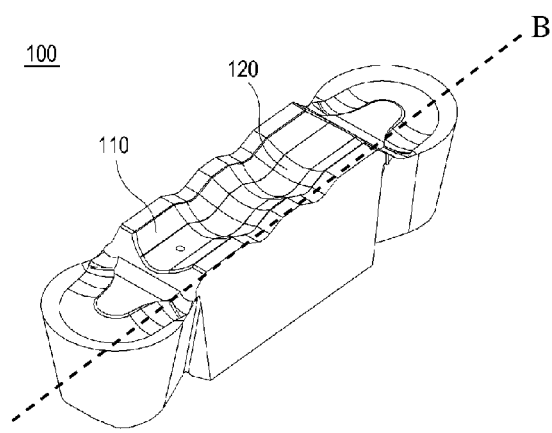
FIG. 6 shows the cutting insert used in the cutting tool in accordance with one embodiment of the present invention.
Figure 7:
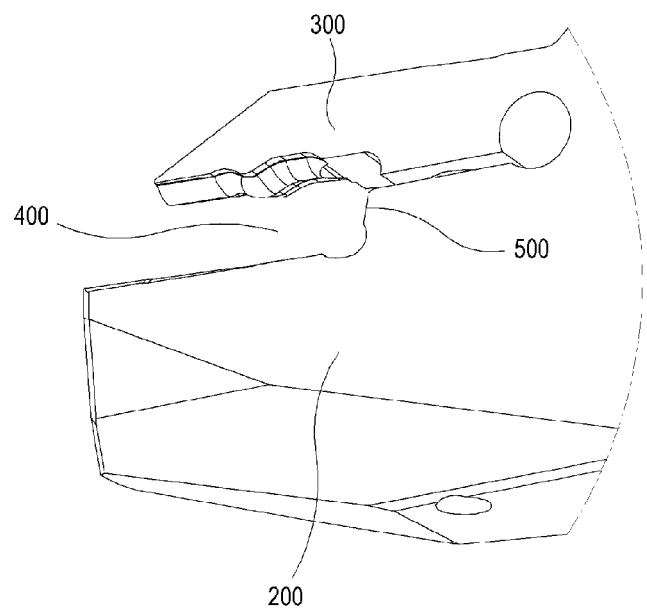
FIG. 7 shows the tool holder of the cutting tool in accordance with one embodiment of the present invention.

FIG. 5 is a perspective view of a cutting tool in accordance with the present invention. FIG. 6 is a cutting insert (100), which is used with the cutting tool. FIG. 7 is a tool holder of the cutting tool. As shown in FIG. 5, the cutting tool of the present invention comprises the cutting insert (100) and the tool holder for securing the cutting insert (100).

As shown in FIG. 7, the tool holder comprises: a base (200) for supporting the bottom surface of the cutting insert (100); a clamping arm (300) for pressing the top surface of the cutting insert (100); an insert receiving space (400) formed between the clamping arm (300) and the base (200); and a supporting surface (500) defining a rear end of the insert receiving space (400) and supporting one end of the cutting insert (100).

The cutting insert (100) comprises: a first pressing region (110) on the front portion of the top surface, which is oriented in a vertically upward direction; and a second pressing region (120) on the rear portion of the top surface, which is oriented at an angle in the front direction. Further, the front portion of the clamping arm (300) mates with the first pressing region (110), while the rear portion of the clamping arm comprises a projection (320) on the bottom surface formed to be mated with the second pressing region (120).

When the cutting insert (100) is fixed to the tool holder, the cutting insert (100) is inserted in the insert receiving space (400) in a direction along a longitudinal insertion axis (A) of the insert receiving space (400) until one end of the cutting insert abuts the supporting surface (500) of the tool holder. The longitudinal insertion axis (A) extends along the insert receiving space (400) between the clamping arm (300) and the base (200), intersecting the support surface (500). Then, as the fixing screw (600) of the tool holder is tightened, the clamping arm (300) presses the top surface of the cutting insert (100). In such a case, the front portion of the clamping arm (300) presses the first pressing region (110) of the cutting insert (100), which is oriented in the vertically upward direction generally perpendicular to the insert longitudinal axis (B), in a first force direction (F1), which is generally vertically downward and generally parallel to the fixing screw longitudinal axis (C). The projection (320) of the clamping arm (300) presses the second pressing region (120) of the cutting insert (100) in the angled second force direction (F2) toward the tool holder, away from the front portion of the clamping arm (300) and the first pressing region (110). Thus, the cutting insert (100) is fixed in the horizontal direction both by the horizontal component of the pressing force exerted by the projection (320) of the clamping arm (300) and the reacting force from the supporting surface (500) of the tool holder. Also, the cutting insert is fixed in the vertical direction by the vertical component of the pressing force exerted by the projection (320) of the clamping arm (300), the downwardly pressing force exerted by the front portion of the clamping arm (300), and the reacting force from the base (200) of the tool holder.

As such, the projection (320), which is formed on the bottom surface of the rear portion of the clamping arm (300), serves to prevent the cutting insert (100) from being pulled out of the tool holder by pressing the cutting insert (100) in the angled direction toward the tool holder. Thus, the front portion of the clamping arm (300) does not need to have any structure such as a nose. Accordingly, the cutting insert (100) may be more firmly fixed, while the strength of the clamping arm (300) may be maintained.

As shown in FIG. 6, the projection (320) is preferably formed in a convex shape along the longitudinal direction on the bottom surface of the clamping arm (300). This is to prevent the projection (320) from being broken by a severe stress intensified onto the projection (320) of the clamping arm (300) when fixing the cutting insert (100) to the tool holder.

Moreover, as shown in FIG. 6, the first pressing region (110) and the second pressing region (120) of the cutting insert (100) are preferably formed to be concave along the width of the cutting insert (100), while the front portion of the clamping arm (300) and the projection are preferably formed to mate with the concavely formed first pressing region (110) and the second pressing region (120), respectively. This is to prevent the cutting insert (100) from being pulled out of the tool holder in the Z-direction (see FIG. 5).

Further, as shown in FIG. 6, the cutting insert (100) is preferably a double-ended insert in which the first pressing region (110) and the second pressing region (120) on the top surface are symmetrically formed in the front portion and the rear portion of the top surface of the cutting insert (100), respectively. Accordingly, the cutting insert (100) may be fixed onto the tool holder in the same manner, even after one cutting edge of the cutting insert (100) has been worn out and the other cutting edge is used.

Although the present invention will now be described with reference to its preferred embodiments, such embodiments of the present invention are only exemplary. A person skilled in the art should understand that various modifications to the embodiments may be also applied without departing from the scope of the present invention. For instance, FIG. 5 shows an embodiment wherein the cutting insert (100) is fixed by tightening the fixing screw (600) of the tool holder. However, another embodiment may be considered wherein the cutting insert is fixed only by the elastic de-formation of the clamping arm (300) itself, without using the fixing screw (600). Also, FIG. 5 shows that the projection (320) of the clamping arm (300) convexly projects along the longitudinal direction of the clamping arm (300). However, it may be considered to employ various shapes other than the convex shape.

According to the present invention, the projection on the rear portion of the clamping arm serves to press the cutting insert at an angle so as to prevent the cutting insert from being pulled out of the tool holder. Accordingly, the front portion of the clamping arm does not need to have any nose portion. Thus, the cutting insert may be more firmly fixed in the tool holder while maintaining the strength of the clamping arm.

The invention claimed is:

1. A cutting tool, comprising:
   a cutting insert comprising a first pressing region on a front portion of a top surface oriented in a vertically upward direction, and a second pressing region on a rear portion of the top surface oriented at an angle in a front direction;
   a tool holder comprising a base for supporting a bottom surface of the cutting insert, a clamping arm for pressing the top surface of the cutting insert, an insert receiving space formed between a bottom surface of the clamping arm and the base, and a supporting surface defining a rear end of the insert receiving space and supporting a rear end of the cutting insert; and
   a fixing screw for fixing the cutting insert to the tool holder, the fixing screw having a longitudinal fixing screw axis (C);
   wherein a front portion of the clamping arm mates with the first pressing region, while a rear portion of the clamping arm comprises a projection on the bottom surface formed to be mated with the second pressing region, and
   wherein the front portion of the clamping arm presses the first pressing region in the vertically downward direction (F1) generally parallel to the longitudinal fixing screw axis (C); and
   wherein the projection of the clamping arm presses the second pressing region in the angled direction (F2) toward the tool holder at a position closer to the longitudinal fixing screw axis (C) than the first pressing region.

2. The cutting tool of claim 1, wherein the projection is protruded in a convex shape in a longitudinal direction at the bottom surface of the clamping arm.

3. The cutting tool of claim 1,
   wherein the first pressing region and the second pressing region are concavely formed in a width direction of the cutting insert, and
   wherein the front portion and the projection formed in the bottom surface of the clamping arm mate with the first pressing region and the second pressing region which are concavely formed.

4. The cutting tool of claim 1,
   wherein the cutting insert is a double-ended insert, and wherein the first pressing region and the second pressing region are symmetrically formed in the front portion and the rear portion of the top surface of the cutting insert.

5. The cutting tool of claim 1, wherein the front portion of the clamping arm is devoid of a nose.

6. A double-ended cutting insert, comprising:
an elongated insert body having a top surface, a bottom surface and first and second ends, with a longitudinal insert axis (B) parallel to the bottom surface in a side view of the cutting insert and passing through the first and second ends;
first and second sets of pressing regions formed on the top surface of the cutting insert;
each set of pressing regions comprising, from a given end,
a first pressing region on a front portion of the top surface, the first pressing region configured to provide support oriented in a vertically upward direction, the vertically upward direction being generally perpendicular to the longitudinal insert axis (B), and
a second pressing region on a rear portion of the top surface, the second pressing region configured to provide support oriented at an angle in a front direction relative to the longitudinal insert axis (B);
wherein the first and second sets of pressing regions are symmetrically formed on the top surface of the cutting insert, such that the cutting insert is rotationally symmetric about a central axis.

7. The double-ended cutting insert according to claim 6, wherein the first pressing region and the second pressing region of each set of pressing regions are concavely formed in a width direction of the cutting insert.

8. The double-ended cutting insert according to claim 6, wherein the first pressing region and the second pressing region of each set are located on opposite sides of an imaginary plane located midway between the two ends.

9. A cutting tool, comprising:
a double-ended cutting insert in accordance with claim 6; and
a tool holder comprising a base for supporting a bottom surface of the cutting insert, a clamping arm for pressing the top surface of the cutting insert, an insert receiving space formed between a bottom surface of the clamping arm and the base, and a supporting surface defining an end of the insert receiving space and supporting an end of the cutting insert;
wherein a front portion of the clamping arm mates with the first pressing region of the first set of pressing regions, while a rear portion of the clamping arm comprises a projection on the bottom surface formed to be mated with the second pressing region of the first set of pressing regions, and
wherein the front portion of the clamping arm presses the first pressing region of the first set of pressing regions in the vertically downward direction and the projection of the clamping arm presses the second pressing region of the first set of pressing regions in the angled direction toward the tool holder.

10. The cutting tool of claim 9, wherein the projection is protruded in a convex shape in a longitudinal direction at the bottom surface of the clamping arm.

11. The cutting tool of claim 9,
wherein the first pressing region and the second pressing region of each set of pressing regions are concavely formed in a width direction of the cutting insert, and
wherein the front portion and the projection formed in the bottom surface of the clamping arm mate with the first set's first pressing region and the second pressing region which are concavely formed.

12. The cutting tool of claim 9, wherein the front portion of the clamping arm is devoid of a nose.

13. The cutting tool of claim 1, wherein:
the first pressing region and the second pressing region are concavely formed in a width direction of the cutting insert; and
a tip end of the projection of the clamping arm faces toward the supporting surface.

* * * * *